US 6,293,687 B1

(12) United States Patent
Poirot et al.

(10) Patent No.: US 6,293,687 B1
(45) Date of Patent: *Sep. 25, 2001

(54) CIRCUIT WITH LIGHT EMITTING DIODES FOR A MOTOR VEHICLE INDICATOR LIGHT, AND A MOTOR VEHICLE INDICATOR LIGHT HAVING SUCH A CIRCUIT

(75) Inventors: Pascal Poirot, Briis sous Forges; Azedine Hamzaoui, Clichy sous Bois, both of (FR)

(73) Assignee: Valeo Electronique, Creteil (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/159,804

(22) Filed: Sep. 23, 1998

(30) Foreign Application Priority Data

Sep. 24, 1997 (FR) .................................................. 97 11877

(51) Int. Cl.⁷ ....................................................... B60Q 1/00
(52) U.S. Cl. ............................ 362/545; 362/249; 362/800
(58) Field of Search ..................................... 362/249, 251, 362/391, 545, 800, 227

(56) References Cited

U.S. PATENT DOCUMENTS

| | | | |
|---|---|---|---|
| 4,641,251 | * 2/1987 | Inoue | 364/513 |
| 5,038,255 | 8/1991 | Nishihashi et al. | |
| 5,062,027 | * 10/1991 | Machida et al. | 362/545 |
| 5,207,492 | * 5/1993 | Roberts | 362/545 |
| 5,325,271 | 6/1994 | Hutchisson . | |

FOREIGN PATENT DOCUMENTS 0 695 907    2/1996   (EP) .

OTHER PUBLICATIONS

Nicholson and Xu, Engineering Design Guide, 3rd Edition, p. 11, 1992.*
French Search Report dated Jun. 5, 1998.

* cited by examiner

*Primary Examiner*—Thomas M. Sember
(74) *Attorney, Agent, or Firm*—Morgan & Finnegan, LLP

(57) ABSTRACT

An indicator light for a motor vehicle includes a circuit comprising a printed circuit, a network of light emitting diodes carried by the printed circuit, and two power supply wires connected to the network. At least one of the power supply wires is a resistive wire having a linear resistance greater than 1 ohm per metre, the length of this wire being such that it provides regulation for the supply current to the diodes.

12 Claims, 1 Drawing Sheet

CIRCUIT WITH LIGHT EMITTING DIODES FOR A MOTOR VEHICLE INDICATOR LIGHT, AND A MOTOR VEHICLE INDICATOR LIGHT HAVING SUCH A CIRCUIT

FIELD OF THE INVENTION

The present invention relates to circuits with light emitting diodes, for motor vehicle indicator lights. It also relates to motor vehicle indicator lights which include such circuits.

BACKGROUND OF THE INVENTION

Conventionally, a motor vehicle indicator light such as an indicator light for giving signals to other traffic, of the kind in which the light source consists of light emitting diodes, the diodes are carried on a substrate which is for example a printed circuit, and a regulating circuit is provided which mainly consists of a power resistor, the regulating circuit being mounted away from the light emitting diodes. One example of this kind of light is described in U.S. Pat. No. 5,325,271.

It has recently been proposed to provide a structure for an indicator light using light emitting diodes which enables the remote regulating circuit to be omitted. That proposed solution consists of incorporating in the network of light emitting diodes crosswise resistors, each of which is associated with one of the diodes and connected in series with the latter. One such circuit is shown in FIG. 1 of the accompanying drawings. In FIG. 1 the resistors are indicated by the reference numeral 1, while the diodes are indicated by the reference numeral 2.

Such a structure eliminates problems related to the wires that connect the substrate carrying the light emitting diodes with the regulating circuit consisting of the power resistor. However, that arrangement is still not fully satisfactory. In particular, the proximity of the resistors and the light emitting diodes gives rise to excessive heating of the diodes. This in turn results in a substantial reduction in their performance, giving a loss of emission in the order of 40%.

SUMMARY OF THE INVENTION

One object of the invention is to propose an alternative solution which has the same advantages in terms of cost and quality as structures of the kind shown by way of example in FIG. 1, but without having the disadvantages.

According to the invention, a light emitting diode circuit for a motor vehicle indicator light, including a support such as a printed circuit, on which a network of light emitting diodes is implanted together with two power supply wires connected to the network, is characterized in that at least one of the wires is a resistive wire having a linear resistance greater than 1 ohm per meter, the length of each resistive wire being such that the said wire regulates the power supply current for the light emitting diodes.

The invention also provides a motor vehicle light with light emitting diodes, characterized in that it includes a circuit according to the invention.

Further features and advantages of the invention will appear more clearly on a reading of the following detailed description of a preferred embodiment of the invention, which is given by way of non-limiting example only and with reference to the accompanying drawings.

DESCRIPTION OF A PREFERRED EMBODIMENT OF THE INVENTION

Figure 2:
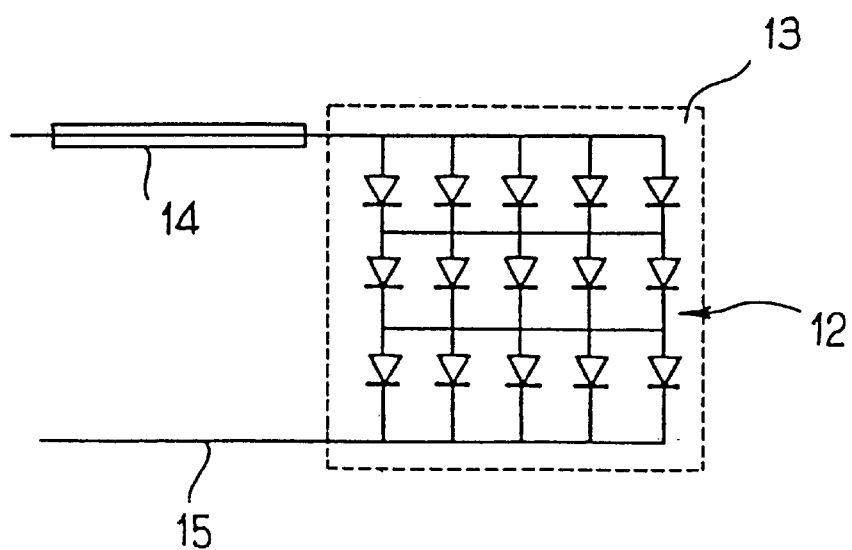
FIG. 2 shows a circuit with light emitting diodes in accordance with the preferred embodiment of the invention.

The circuit shown in FIG. 2 comprises a network 12 of light emitting diodes mounted on a printed circuit 13, together with two connecting wires 14 and 1 5 which are connected so as to connect the diode network 12 to a power supply source.

At least one of these two wires 14, 15 is a resistive wire which has a linear resistance greater than 1 ohm per meter. Thus, regulation of the current in the diodes 12 is obtained by means of the remote resistor constituted by the power supply wires 14 and 15. One of these wires 14 or 15 can be a resistive wire, with the other being a standard conductor. In yet another version, each of the wires 14 and 15 is a resistive wire.

The composition of the resistive wire is preferably a nickel/chrome alloy. Resistive wires of this composition are sold by the Company Axon'Cable S.A. under the Trade Mark NIKROTHAL 80, 70 with a diameter of 0.1 mm and a linear resistance of 139 ohm per meter at 20° C. The length or diameter (determining the linear resistance) of the resistive wire, or of each resistive wire, is determined according to the required value for the regulating resistance. The diameter of the wire imposes crimping stresses on the terminal elements of the connectors, such as spades or eyes.

The resistive wire is sheathed in an insulating material, as shown in FIG. 2 by wire 14, such as fluorethylenepropylene (FEP), a material which is able to withstand a temperature of 205° C. in continuous operation. However, other materials can be envisaged subject to restrictions such as the requirements as to flammability or temperature resistance of the insulated resistive wire.

Figure 1:
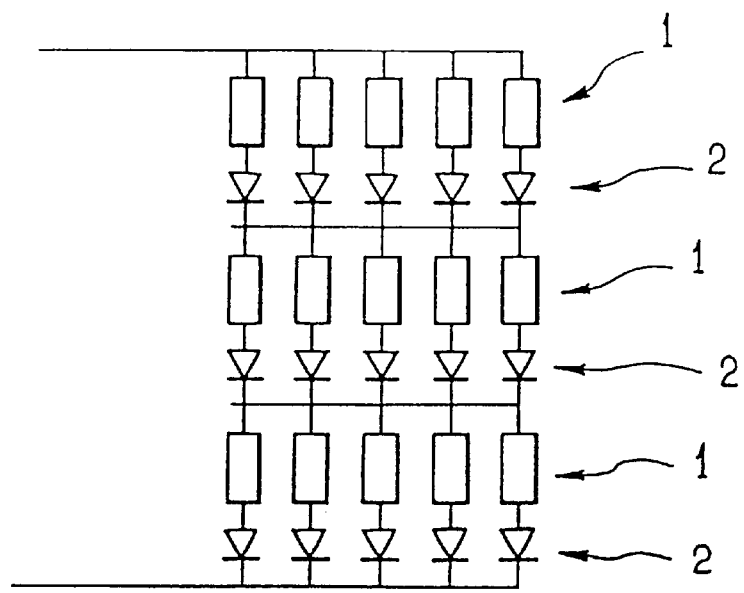
FIG. 1, shows a circuit with light emitting diodes, known in the prior art.

FIGS. 1 and 2 show light emitting diode networks in which the diodes are arranged in matrices with a 3×5 configuration. This number of diodes and matrix configuration are of course given by way of example only.

The circuit itself preferably contains no resistive component, substantially all of its resistive functions being provided by the power supply wire or wires.

What is claimed is:

1. A motor vehicle indicator light comprising
   a support, and
   a circuit carried by the support, said circuit comprising
      a plurality of light emitting diodes connected in a network, and
      two permanent power supply wires connecting the network to a power supply source,
      wherein at least one said permanent power supply wire is a resistive wire having a linear resistance greater than 1 ohm per meter, the length and the diameter of said resistive wire being such that said resistive wire ensures regulation of the power supply current to the light emitting diodes.

2. A motor vehicle indicator light according to claim 1, wherein said resistive wire has a core of a nickel/chrome composition.

3. A motor vehicle indicator light according to claim 1, wherein said resistive wire is sheathed in an insulating material.

4. A motor vehicle indicator light according to claim 1, wherein no additional resistive component is present in the circuit.

5. A motor vehicle having the indicating light according to claim 1.

6. A circuit comprising:

a plurality of light emitting diodes connected in a network and mounted on a support; and two permanent wires connecting the network to a power supply source, wherein one of the permanent wires is a resistive wire having a linear resistance greater than 1 ohm per meter, and has a length and a diameter such that the wire regulates the current for the light emitting diodes.

7. A circuit according to claim 6, wherein the resistive wire is sheathed in an insulating material capable of withstanding a temperature of 205° C.

8. A circuit according to claim 6, wherein each of the wires is a resistive wire.

9. A circuit according to claim 6, wherein one of the wires is a standard conductor.

10. An indicating light for a vehicle comprising the circuit of claim 6.

11. A circuit comprising:

a plurality of light emitting diode connected in a network and mounted on a support; and means for connecting the network to a power supply source.

12. A circuit comprising:

a plurality of light emitting diode connected in a network and mounted on a support; and two permanent wires connecting the network to a power supply source, wherein at least one of the permanent wires is a resistive wire having a linear resistance greater than 1 ohm per meter and a length and a diameter such that the wire regulates the current for the light emitting diodes, said resistive wire comprising nickel/chrome alloy and a sheath of insulating material capable of withstanding a temperature of 205° C.

* * * * *